(12) United States Patent
Fifield

(10) Patent No.: US 6,899,839 B2
(45) Date of Patent: May 31, 2005

(54) BUILDING PRODUCTS

(75) Inventor: John Alfred Fifield, Aylesbury (GB)

(73) Assignee: Shell Oil Company, Houston, TX (US)

( * ) Notice: Subject to any disclaimer, the term of this patent is extended or adjusted under 35 U.S.C. 154(b) by 105 days.

(21) Appl. No.: 10/204,301

(22) PCT Filed: Feb. 21, 2001

(86) PCT No.: PCT/EP01/02001

§ 371 (c)(1),
(2), (4) Date: Nov. 8, 2002

(87) PCT Pub. No.: WO01/62476

PCT Pub. Date: Aug. 30, 2001

(65) Prior Publication Data

US 2003/0122273 A1 Jul. 3, 2003

(30) Foreign Application Priority Data

Feb. 21, 2000 (GB) .............................. 0004049

(51) Int. Cl.[7] .................. B29C 43/02; B29C 43/04; B29C 43/50; B29C 33/02; B29C 70/58
(52) U.S. Cl. ................ 264/109; 264/297.8; 264/297.9; 264/327; 264/334; 264/335; 425/346; 425/351; 425/444
(58) Field of Search ............................ 264/109, 112, 264/122, 297.8, 297.9, 327, 334, 335, 351; 425/346, 444, 351

(56) References Cited

U.S. PATENT DOCUMENTS

| | | | | |
|---|---|---|---|---|
| 3,287,146 A | * | 11/1966 | Rogers et al. ............... 106/278 |
| 3,341,344 A | * | 9/1967 | Ginsberg et al. ........ 106/284.04 |
| 3,839,518 A | * | 10/1974 | Rubens et al. ............... 264/45.4 |
| 3,864,858 A | * | 2/1975 | Rochfort ...................... 404/98 |
| 4,450,133 A | | 5/1984 | Cafarelli |
| 4,456,705 A | * | 6/1984 | McCarthy ................... 521/83 |
| 5,209,886 A | * | 5/1993 | Simons ...................... 264/109 |
| 5,307,608 A | * | 5/1994 | Muir et al. .................. 53/440 |
| 5,403,117 A | | 4/1995 | Okuyama et al. |
| 5,743,950 A | * | 4/1998 | Hendriks et al. ........ 106/281.1 |
| 5,759,250 A | * | 6/1998 | Malot et al. ............. 106/281.1 |
| 5,800,754 A | | 9/1998 | Woods |
| 6,679,941 B2 | * | 1/2004 | Van Der Horst et al. ....................... 106/284.01 |
| 6,749,678 B1 | * | 6/2004 | Reynhout ................ 106/281.1 |
| 2003/0065082 A1 | * | 4/2003 | Blanken et al. ............. 524/492 |
| 2003/0160218 A1 | * | 8/2003 | Van Der Horst et al. ... 252/500 |
| 2004/0055706 A1 | * | 3/2004 | Hovenkamp et al. ....... 156/337 |

FOREIGN PATENT DOCUMENTS

| | | | | |
|---|---|---|---|---|
| DE | 3724561 A1 | 2/1989 | .......... B29C/45/18 |
| GB | 05439 A | 4/1897 | |
| GB | 865669 | 3/1959 | |
| GB | 947917 A | 1/1964 | |
| WO | 00 46164 A1 | 8/2000 | .......... C04B/26/26 |

OTHER PUBLICATIONS

"The Shell Bitumen Handbook", Sept. 1991. p. 90.
Kirk–Othmer. "Encyclopedia of Chemical Technology". vol. 3., pp. 297–298.
Standard Regelgeving Advisering Wegenbouw, 1995 test 67 document.
ISO/R 836, European Federation of Manufacturers of Refractory Products. Revision 1990. (PRE/R 14–1), pp. 1–7.
NEN 7014. Nederlands Normalisatie Instituut. 2nd edition Aug. 1974 Betontegels. "Concrete Paving Slabs".

* cited by examiner

Primary Examiner—Michael P. Colaianni
Assistant Examiner—Michael I. Poe

(57) ABSTRACT

A method of manufacturing a building product from a mix (6) including particulate material and a thermoplastic binder which comprises heating the mix at least to a temperature at which the thermoplastic binder in the mix liquefies, subjecting the heated thermoplastic mix to a pressing action that shapes the heated mix, and cooling the shaped heated thermoplastic mix to solidify the thermoplastic binder and form the product (FIG. 4).

7 Claims, 8 Drawing Sheets

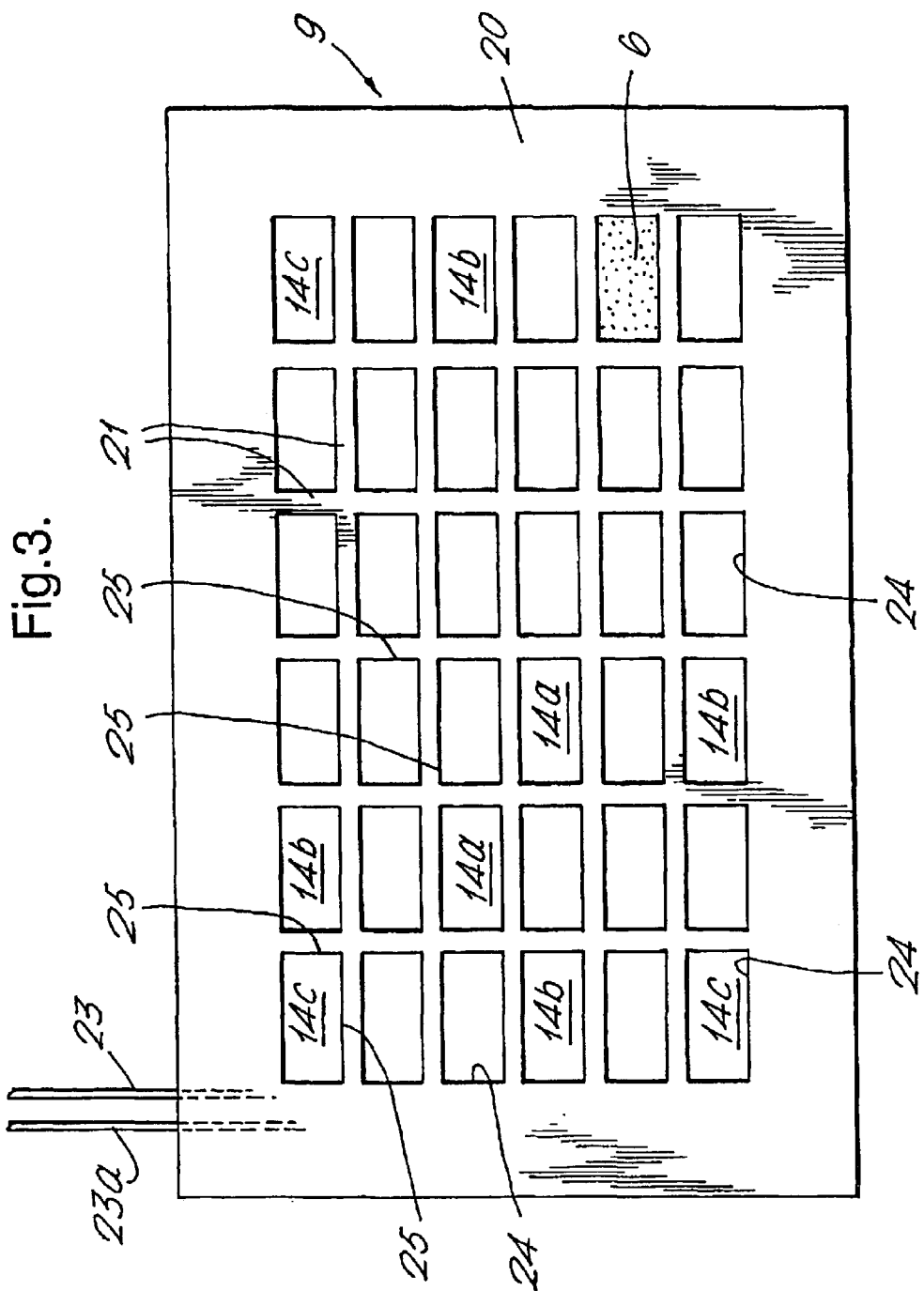

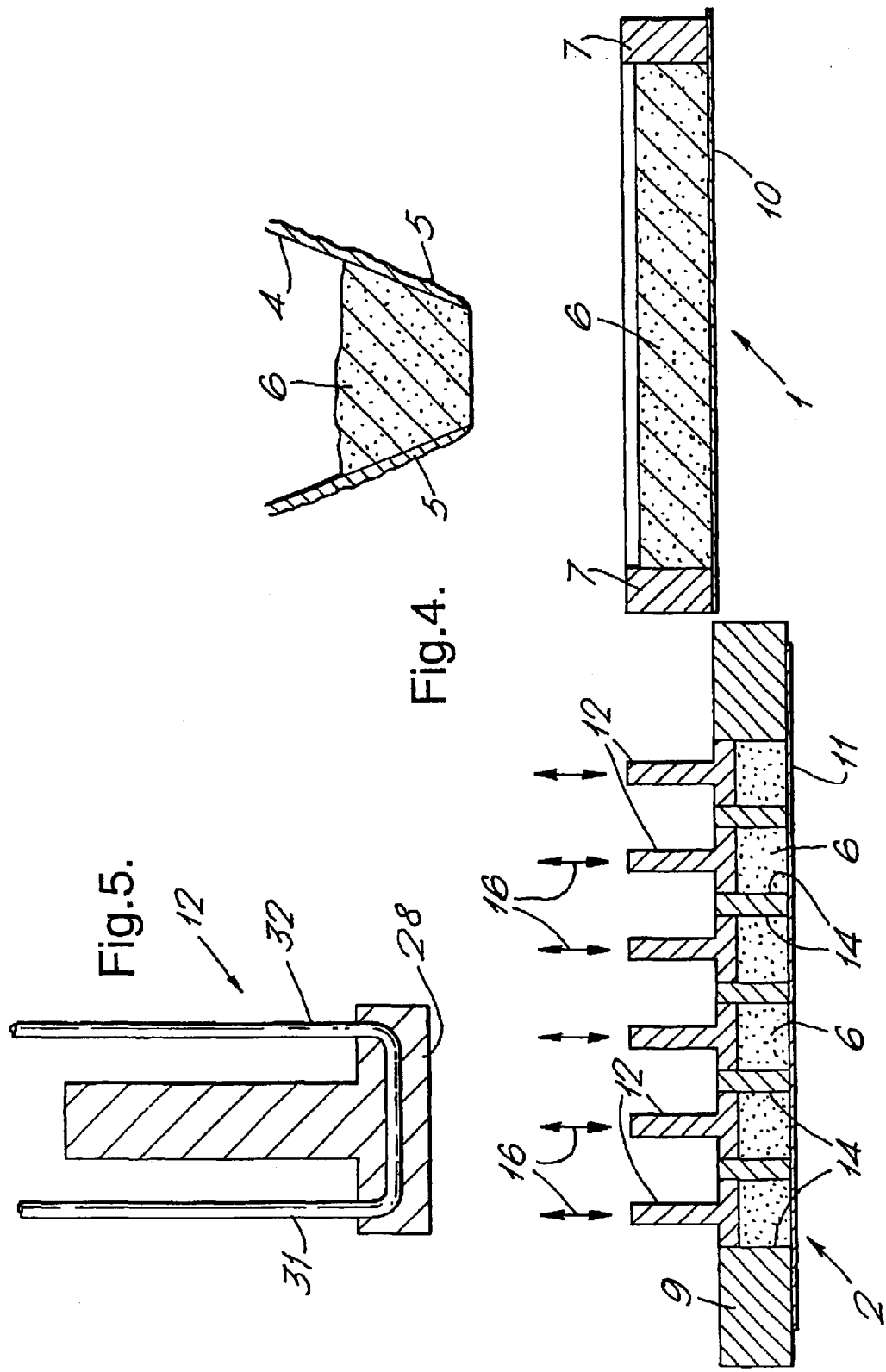

BUILDING PRODUCTS

This invention relates to building products, more particularly but not exclusively for use in, and for, the building, construction and civil and structural engineering industries.

Concrete building products, such as masonry, paving, paving flags, paviours, flagstones, blocks, bricks, tiles, slates, posts, lintels, sills, slabs and panels and claddings and linings for walls, ceilings, roofs and floors have been made for many years for pressing or moulding processes. Hereinafter such pressing or moulding processes will be generically referred to for convenience as "pressing". Concrete products are typically made of a mix including fine particles such as sand, coarse particles such as an aggregate, a cement binder, a filler and water etc. with the aggregate or alternatively a pigment providing colour to the concrete product.

A typical pressing process involves the use of what is commonly known as a static block making machine. Pallets made from metal, plastics or wood are fed by a conveying means into the block making machine which comprises a mould, a concrete mix filling means one or more compacting devices, optional vibration devices, a stripping device, and an outgoing conveying means. The pallet, which forms the profile of one side of the block, is located under the mould in the machine. The mould comprises one or more side walls each defining a side of the desired block, and preferably the compacting and stripping device forms the final side of the block. Once the pallet has been located, the mould is lowered on to the pallet and held in frictional contact to define a mould cavity comprising the upper surface of the pallet, and the surfaces of the sidewalls of the mould.

The mould cavity is then filled with a concrete mix of the desired composition optionally using vibration or other levelling means to achieve a desired profile of concrete. A compacting head, which preferably will also be used for stripping, is then lowered on to the upper surface of the concrete mix in the mould cavity and the concrete mix is compacted by the force exerted by the compacting head, such force being direct pressure and/or vibration to shape and form the product. Optionally, the mould cavity is then filled with a second concrete mix of another desired composition again optionally using vibration or other levelling means to achieve a desired profile of concrete mix. The use of two filling operations allows the manufacture of a block which primarily comprises a strong cost effective non-visible layer in use and a more pleasantly aesthetic visible layer in use that may contain more expensive ingredients.

The compacting forces are stopped and the mould is then raised from the pallet with both the pallet and the compacting head, now acting as a stripping device, being held in stationary alignment. When the mould has been raised clear of the green (uncurred) concrete block the compacting/stripping head is also raised clear of the green concrete. The formed green concrete block is then conveyed out of the block making machine on the pallet on which it was formed.

Optionally, the formed green concrete block on its pallet is conveyed into a secondary processing area, such as a washing station, to effect an exposed aggregate finish and then into an area where it is allowed to cure to a hardened state. Having cured to a sufficiently hardened strength the block is then optionally transported to another secondary processing area where it is subjected to the action of secondary processing apparatus such as a shotblasting machine, bush hammer, chain flailer or the like and then into an area where it is packaged for delivery. In some cases the depalleted blocks are put into yard storage for a period of time before returning to a secondary processing area. The pallet is conveyed back into the block making machine and the making cycle restarts.

Many other presses, pressing processes, apparatus and machinery and secondary processes and processing machinery, other than those described, are available. By way of example, hermetic pressing machines, hydraulic pressing machines that require no vibration, hammer action presses, presses using stamper plates, and presses with roller action are all used to make the same product type.

GB 947,917 describes a method of making hardened moulded bodies such as blocks, tubes, briquettes, or paving slabs by mixing of solid granular and or pulverulent mineral particles such as stone, ore, or coal with a preferably soft bitumen as binder by coating the individual solid particles with a thin film of bitumen having a thickness of about $10\mu$ or less, said method including the steps of moulding the bituminous mix by compacting pressure applied at such conditions that in the moulded bituminous body a void space of from 5 to 30% by volume of the mass is retained, and thereafter exposing the formed body to action of air at a temperature of from 300 to 600° F. to harden the bitumen in the body.

The production of cement is a costly process involving a significant use of energy since it involves the calcining of limestone. Furthermore, the calcining of limestone liberates carbon dioxide and in total the manufacture of 1 tonne of cement is accompanied by the liberation of 1 tonne of carbon dioxide to atmosphere. Accordingly, the inventors have investigated ways of replacing the cement binder of conventional concrete with a binder which can be produced without the disadvantages involved in the production of cement and yet enables the use of existing equipment and methodological for producing concrete products.

Accordingly, the-present invention provides a method of manufacturing a building product from a mix including particulate material, and a binder, characterised by the binder being a thermoplastic binder, which comprises heating the mix including the thermoplastic binder at least to a temperature at which the thermoplastic binder in the mix liquefies, subjecting the heated thermoplastic mix to a pressing process that shapes the heated thermoplastic mix, and by cooling the shaped heated thermoplastic mix to solidify the thermoplastic binder and form the building product.

The thermoplastic binder of the present invention may be a polymeric material, for example polyethylene, polyurethane, or polyvinylchloride. However, in a preferred embodiment of the present invention the thermoplastic binder is a bituminous binder, more preferably an asphaltenes-containing binder having a penetration of less than 15 dmm.

Accordingly, the present invention further provides a method of manufacturing a building product from a mix including particulate material and a binder, characterised by the binder being an asphaltenes-containing binder having a penetration of less than 15 dmm, which comprises heating the mix including the asphaltenes-containing binder to a temperature at which the asphaltenes-containing binder in the mix liquefies, subjecting the heated asphaltenes-containing mix to a pressing action that shapes the heated mix, and cooling the shaped heated asphaltenes-containing mix to solidify the asphaltenes-containing binder and form the building product.

Asphaltenes are constituents of bituminous materials which are soluble in carbon disulphide, but not in petroleum spirit. Typically, asphaltenes constitute 5% to 25% of a bituminous material (page 90 of the Shell Bitumen Handbook September 1991), the remainder of a bituminous material comprising constituents such as resins, aromatics and saturates, which are collectively referred to as maltenes. The presence of asphaltenes can be established using test method IP143/96.

The penetration of the asphaltenes-containing binder according to the preferred embodiment is measured according to ASTM D5 at 25° C. Preferably the asphaltenes-containing binder has a penetration of less than 15 dmm, more preferably of from 1 dmm to less than 15 dmm.

Preferably, the asphaltenes-containing binder has a penetration of at most 10 dmm, more preferably less than 10 dmm and most preferably less than 8 dmm. Further, the binder preferably has a penetration of at least 1 dmm at 25° C., more preferably at least 2 dmm, more preferably at least 4 dmm. The penetration values below 2 dmm can be measured by measuring at 40° C. and subsequently extrapolating the results to 25° C.

The asphaltenes-containing binder according to the preferred embodiment preferably has a softening point measured according to the ring and ball test of ASTM D 36, of at least 50° C., more preferably at least 70° C., even more preferably at least 100° C. Further, the binder preferably has a softening point of at most 157° C., more preferably at most 150° C., even more preferably at most 130° C.

The asphaltenes-containing binder of the preferred embodiment can be prepared in any way that is well-known to someone skilled in the art, provided that the binder obtained has the required hardness.

A process by which an asphaltenes-containing binder may be prepared is deasphalting, more particularly propane deasphalting. In this process, a residue from distillation of crude oil is treated with solvent under controlled conditions such that bitumen binder is precipitated. The solvent preferably is propane, propane-butane mixtures or pentane. Most preferably, the solvent is propane. The residue is usually residue from an atmospheric distillation tower. The process is primarily used for crude oils of relatively low asphalt content. The process can suitably be carried out as a countercurrent liquid-liquid extraction. Further details of the process are well known to someone skilled in the art. Suitable processes have been described in Kirk-Othmer Encyclopedia of Chemical Technology, Volume 3, pages 297–298.

The asphaltenes-containing binder of the preferred embodiment preferably contains (i) from 15 to 95% by weight, based on total binder, of asphaltenes, as determined according IP 143/96, which asphaltenes contain at least 60% aromatic carbon, and (ii) from 5 to 85% by weight, based on total binder, of further hydrocarbons as determined according IP 143/96. The percentage of aromatic carbon atoms present in the asphaltenes is measured by separating off the asphaltenes in the binder as described in IP 143/96, dissolving a sample of the asphaltenes in carbon disulphide or chloroform and assessing the percentage of aromatic carbon by $^{13}$C NMR.

The asphaltenes comprise hydrogen, carbon and optionally other atoms. Specifically, the asphaltenes can contain up to 15% by weight of atoms other than hydrogen and carbon, more specifically sulphur, nitrogen and oxygen, preferably at most 12% by weight, most preferably at most 10% by weight, based on asphaltenes.

Generally, the further hydrocarbons present in the above preferred binder, can contain up to 15% by weight of atoms other than hydrogen and carbon, more specifically sulphur, nitrogen and oxygen, preferably at most 12% by weight, most preferably at most 10% by weight, based on further hydrocarbons.

Preferably, the asphaltenes-containing binder contains at least 20% by weight of asphaltenes, based on total binder. More preferably, the binder contains at least 25% by weight of asphaltenes. The amount of asphaltenes is preferably up to 95% by weight, more preferably up to 70% by weight, more preferably up to 60% by weight, more preferably up to 50% by weight, more preferably up to 45% by weight, most preferably at most 40% by weight.

The asphaltenes-containing binder containing (i) from 15 to 95% by weight of asphaltenes-containing at least 60% aromatic carbon, and (ii) from 5 to 85% by weight of further hydrocarbons, may be prepared by subjecting hydrocarbons to thermal cracking. Preferably, a residual hydrocarbon fraction is subjected to thermal cracking. The thermally cracked product can be used as such, or in combination with any other hydrocarbon fraction as long as the required hardness is achieved.

Preferably, the asphaltenes-containing binder consists at least partly of product obtained by subjecting hydrocarbons to thermal cracking. Most preferably, the binder consists of product obtained by subjecting hydrocarbons to thermal cracking. Although in such case part of the thermally cracked product can be used, the binder only contains product which has been thermally cracked.

Thermal cracking is preferably carried out by pre-heating a hydrocarbon fraction to a temperature from 350 to 500° C., maintaining the pre-heated oil at such conditions as to cause thermal cracking and subsequently separating off one or more light fractions. Thermal cracking of residual fractions usually involves a temperature of between 300 and 600° C. The pressure can be in the range from 1 to $100 \times 10^5$ N/m$^2$ (bar), preferably in the range from 2 to $20 \times 10^5$ N/m$^2$ (bar). Thermal cracking is preferably carried out in a soaker. The thermally cracked product as such can be used as binder, or the binder can be only a part of the thermally cracked product. In the latter case, the binder is separated from the thermally cracked product in any suitable way. Preferably, the binder is produced by separating off the light fractions by flash distillation, more preferably by vacuum flash distillation.

Another process by which the asphaltenes-containing binder can be obtained comprises subjecting a residual fraction to hydroconversion at a temperature in the range from 200 to 450° C. and a pressure in the range from 50 to $200 \times 10^5$ N/m$^2$ (bar), optionally preceded by hydrodemetallization. Preferably, the hydroconversion is hydrodesulphurization.

In the method of the present invention it is preferred to use bituminous binders, in particular asphaltene-containing binders having a penetration of less than 15 dmm as the thermoplastic binder of the present invention, as building products prepared using these binders display, amongst other attributes, excellent flexural strength, compression strength, impact and crack resistance, and are substantially water-proof.

The particulate material to be used in the method of the present invention may in principle be of any type of particulate material, for example mineral particles, cement, concrete, dust, recycled asphalt, recycled tyres, clay, old sand, porous particles such as zeolite and perlite, crushed shells, shells, organic waste such as leaves and bones, fly ash, wood particles such as chips, flakes, etc. Preferably, the particulate material is in the form of mineral particles.

Preferably the particulate material employed in the method of the present invention is a combination of particles having a particle size of at most 63 micrometers (so-called filler) and particles having a particle size in the range from 63 micrometers to 2 mm (so-called sand) and particles having a particle size in the range from 2 to 8 mm, preferably from 4 to 8 mm (so-called stones or aggregates), optionally in combination with particles having larger sizes. The particle sizes are measured by sieving with sieves having openings of the indicated size. Preferably, the amount of each of filler, sand and stones is in the range from 10 to 50% by weight, (the combination to total 100% by weight) based on total amount of particulate material. Particulate materials having a particle size of more than 8 mm are preferably present if larger objects are made. Accordingly, in a preferred method according to the present invention the particulate material includes sand aggregate and filler.

The temperature at which the thermoplastic binder in the mix liquefies is dependent upon the softening point of the thermoplastic binder being employed. Where the thermoplastic binder is a asphaltenes-containing binder the temperature at which the asphaltenes-containing binder liquefies is preferably at least 50° C., more preferably at least 70° C., even more preferably at least 100° C.

By means of the invention, the liquid phase of the thermoplastic binder acts like water to lubricate and bind the particles of the thermoplastic mix together during the pressing process thereby avoiding the use of water which is necessary in addition to the cement binder with concrete mixes. Moreover, the thermoplastic binder enables a building product to be simply and easily produced using existing apparatus, thereby avoiding the costs of new plant and machinery. Where the thermoplastic binder is a bituminous binder, the liquid phase of the binder is the maltene phase.

Accordingly, a preferred method according to the present invention is a method wherein the liquid phase of the thermoplastic binder lubricates and binds during the pressing action.

The inventors have coined the term 'hybrid' to qualify the completely new building products prepared by the present invention because a thermoplastic binder, which is a synthetic or bituminous material, would hitherto have been thought of as a non-compatible material to use for the manufacture of concrete building products which are traditionally made from natural materials and use pressing, but not pressing and heat, to shape and form the product. The mix can also be termed—'hybrid thermoplastic mix' because it includes a synthetic thermoplastic material and natural materials such as sand, aggregate, fillers etc.

Unexpectedly, not only does the method of the invention work to produce simple building products in the form of blocks, the invention is capable of producing a wide a variety of building products including masonry, paving, paving flags, paviours, flagstones, blocks, bricks, tiles, slates, posts, lintels, sills, slabs and the like, which has hitherto been achieved with traditional equipment and methodologies. Examples of building products which may be conveniently prepared by means of the present invention are construction elements as described on page 16, lines 28 to page 17 line 25 of WO 00/46164.

By definition a thermoplastic material softens when exposed to heat, liquefies when the temperature is elevated beyond the materials melting point, and returns to its original condition when cooled to ambient temperature.

When the thermoplastic mix, containing the thermoplastic binder is heated, conveniently in a supply hopper, the liquefied thermoplastic binder forms a coating around the aggregate, sand and fine filler particles and the heated thermoplastic mix is transferred from the hopper to a cavity of a mould forming part of a pressing apparatus such as a block making machine.

Preferably, in order to produce a more cost effective hybrid building product, the proportion of the particulate material such as sand, aggregate, fillers etc. is greater, and desirably far exceeds, the proportion of thermoplastic binder because the particular material portion of the thermoplastic mix is the lowest cost material employed. Expressed in another way, the lower proportion of thermoplastic binder in the thermoplastic mix, the more cost effective the final product becomes. Accordingly, a preferred method according to the present invention is a method wherein the proportion of the particulate material in the thermoplastic mix is greater than the propertion of thermoplastic binder. Even though at elevated temperatures only a fraction of the thermoplastic mix assumes liquid form, the inventors have found that this is still sufficient to enable the thermoplastic mix to flow into and fill the mould. Accordingly, a further preferred method according to the present invention is a method wherein the heating of the thermoplastic binder is such that a fraction only of the thermoplastic mix assumes liquid form but is consistent with enabling the thermoplastic mix to flow.

Preferably the hybrid building products have a thermoplastic binder content of less than 30% by weight, more preferably from 1 to less than 30% by weight. Preferably, the thermoplastic binder is present in an amount of at least 2% by weight, more preferably in an amount of at least 3% by weight, most preferably at least 4% by weight. Preferably, the thermoplastic binder is present in an amount of up to 15% by weight, more preferably up to 10% by weight, most preferably up to 8% by weight.

Accordingly a preferred method according to the present invention is a method wherein the proportion of thermoplastic binder is less than 30% by weight of the thermoplastic mix, more preferably less than 10% by weight of the thermoplastic mix.

When the proportion of thermoplastic binder is less than 10% by weight of a particulate mix including aggregate, sand and fine filler, the inventors have found that the thermoplastic binder in a hot hybrid thermoplastic mix is in a liquid form that is flowable sufficient to be transferably from a holding hopper of a conventional concrete block making machine and into the mould cavity therein.

Preferably, building products prepared by means of the method of the present invention have a flexural strength of at least 0.5 N/mm$^2$. Preferably, the flexural strength is at least 3 N/mm$^2$, more preferably at least 4 N/mm$^2$, more preferably at least 5 N/mm$^2$, most preferably at least 6 N/mm$^2$. Flexural strength is measured according to NEN 7014, "Nederlands Normalisatie Instituut" , 2$^{nd}$ edition 8/1974.

In addition, it has been found that good compression strengths can be obtained by using the method of the present invention to prepare building products. Compression strengths which can be obtained are 5 N/mm$^2$ or more, preferably 10 N/mm$^2$ or more, more specifically 15 N/mm$^2$ or more, measured according to ISO/R 836 of the European Federation of Manufacturers of Refractory Products as revised in 1990, PRE/R 14-1.

Unlike conventional thermoplastic materials but as with conventional concrete mixes containing natural materials including a cement binder, the hybrid thermoplastic mix of the invention requires compacting by direct pressure and/or vibration by suitable pressing means to eliminate or at least substantially reduce undesirable voids which weaken the finished product. One form of pressing means suitable for use in this invention comprises at least one compacting head. Accordingly, a preferred method according to the present invention is a method wherein the thermoplastic mix is compacted by pressing and/or vibration.

Compaction may be achieved by any conventional means but is preferably by lowering a compacting head on to the upper surface of the hybrid thermoplastic mix in the mould cavity which exerts a force by direct pressure and/or vibration. The compacting head may also be used for stripping. The resultant action of the applied pressure and/or vibration is that the hybrid thermoplastic mix is compacted within the mould cavity until the particles, i.e. sand, aggregates and fine fillers, are closely packed with the thermoplastic binder in liquid form/phase acting as a lubricant to assist in closely packing the particles.

As the application of the compacting force is continued, the compacting force acts primarily on the thermoplastic binder in liquid phase enabling the binder to flow around and between the particulate materials, including sand, aggregate and fine fillers, and to fill any voids there between.

Accordingly, a preferred method according to the present invention is a method wherein the particulate material includes sand, aggregate and fine filler wherein prior to the pressing action the particles of the thermoplastic mix and thermoplastic binder are in a loosely packed arrangement with there being voids between the particles and the particle being coated with a layer of thermoplastic binder and fine filler; a further preferred method being a method wherein the fine filler and thermoplastic binder coating lubricates the sand and aggregate particles to provide a product in which the particles are in a closely packed arrangement with the voids being filled by thermoplastic binder and fine filler.

The building products prepared by means of the present invention preferably have a void content of at most 3%, more preferably at most 2.5%, most preferably at most 2.0%. The void content is determined according to the "Standaard Regelgeving Advisering Wegenbouw", 1995, test 67.

When the compacting forces are stopped, the mould is then raised from the pallet, with the compacting head, now acting as a stripping device, being held in stationary alignment and with the formed and shaped block of compacted hybrid thermoplastic mix being left on the pallet. When the mould has been raised clear of the formed block the compacting/stripping head is also raised clear of the compacted hybrid thermoplastic mix. The formed blocks of compacted hybrid thermoplastic mix is then conveyed out of the block making machine on the pallet on which they were formed.

The formed blocks may be allowed to cool on their own sufficiently to enable handling and packaging, i.e. under ambient conditions without any additional cooling being provided. However, this takes a long time and the cooling process is ideally accelerated by subjecting the formed blocks to a cooling process, for example quenching with water, before being conveyed into a racking station where they are allowed to cool sufficiently to enable handling and packaging. The benefit of subjecting the blocks to a cooling process such as quenching is to solidify the thermoplastic binder close to the outside parts of the formed blocks such that the shape of said blocks is maintained during subsequent handling whilst most of the block remains in a plastic state.

In order to ensure that the thermoplastic binder remains in liquid form prior to being fed into the mould cavities, the hybrid thermoplastic mix is maintained at a desired elevated temperature by heating the walls of one or more supply hoppers for the hybrid thermoplastic mix and/or insulating against loss of heat from the or each supply hopper by lagging. Accordingly, a preferred method according to the present invention is a method wherein the thermoplastic binder is heated in a supply hopper such that the thermoplastic binder assumes liquid form to enable the thermoplastic binder mix to flow; and a more preferred method is a method wherein the thermoplastic mix is heated in a supply hopper and maintained at the desired elevated temperature in the supply hopper.

Moreover, the mould cavities need to be held at a controlled temperature range to ensure correct compaction of the thermoplastic mix because low mould cavity temperatures causes premature solidification of the thermoplastic binder resulting in poorly compacted products. More particularly, the construction of mould boxes with multiple cavities results in there being large masses of metal material forming the outer frame of the mould box that is sub-divided into smaller mould cavities by the use of thin metal divider plates. In use, and with continual charging with hybrid thermoplastic mixer at elevated temperatures, the thin divider plates rapidly rise to a temperature close to that of the mix itself. Whilst this rapid rise in temperature of the thin divider plate ensures that there will be no premature solidification of the thermoplastic binder, preferably the divider plates may be cooled such as to reduce any tendency towards sticking of the thermoplastic mix to the divider plates and consequently ensure satisfactory stripping therefrom.

It will be appreciated that the large masses of material forming the outer frame of the mould also form the side walls of the small mould cavities around the perimeter of the mould. Even in use, and with continual charging with hybrid thermoplastic mixes at elevated temperatures, the large mass of the mould frame acts as a heat sink such that it never attains a temperature close to that of the mix itself. This can cause premature solidification of the thermoplastic binder in the mix and consequentially produce poorly compacted products at least in so far as their side walls are concerned. Accordingly, it is desirable to heat the mould frame.

Again, with mould blocks having multiple cavities, the compacting head comprises an array of stripper shoes, one for each mould cavity. As these stripper shoes are of low mass and, like the division plates within the mould cavity, in use rapidly attain a temperature which is close to that of the hybrid thermoplastic mix itself due to being continually charged with high temperature hybrid thermoplastic mixes. Whilst this ensures that there will be no premature solidification of the thermoplastic binder which would clearly be undesirable, advantageously the stripper shoes are cooled such as to reduce any tendency toward sticking of the hybrid thermoplastic mix to the shoes to ensure satisfactory stripping therefrom.

Unlike other known processes using thermoplastic materials which rely on re-solidification of the thermoplastic material within a mould to ensure the dimensional integrity of the finished product, the inventors have found that the hybrid thermoplastic mixes of the invention do not require cooling within the mould cavities to solidify the thermoplastic binder before it is ejected therefrom. Even when demoulded, the shaped, formed and fully compacted hybrid thermoplastic product remains self-supporting when demoulded and may be allowed to cool and solidify over a period of some hours or even days provided that no external pressure is applied. However, the long time intervals needed for sufficient cooling may add undesired costs to the overall process because additional carrier plates, racks etc. would be necessary.

Accordingly, in another preferred embodiment of the invention, rapid cooling of the demoulded products is provided to considerably speed up the cooling process, for example by way of immersion in a water bath or drenching in water sprays.

The present invention further provides a building product obtainable by the method of the present invention.

In order that the invention may be more fully understood, reference will now be made, by way of example to the accompanying drawings, in which:—

FIGS. 1, 2, 4, 6, 7 and 8 are diagrammatic cross-sectional side elevations through a pressing apparatus in various stages of carrying out a method of manufacturing a building product according to the present invention;

FIG. 3 is a plan view of a mould box comprising a plurality of mould cavities and forming part of the pressing apparatus of FIGS. 1, 2, 4, 6, 7 and 8;

FIG. 5 is a diagrammatic part-sectional view to an enlarged scale through an individual pressing means forming part of the pressing apparatus of FIGS. 1 to 4 and 6 to 8;

Referring to FIGS. 1 to 8 there is shown an apparatus for manufacturing a building product such as building block from a mix including particular material comprising fine particles in the form of sand and filler, coarse aggregate particles and a thermoplastic binder. The thermoplastic mix is heated in the apparatus at least to a temperature at which the thermoplastic binder in the thermoplastic mix liquefies, the heated thermoplastic mix is subjected to a pressing process that shapes the heated thermoplastic mix and the shaped heated thermoplastic mix is cooled to solidify the thermoplastic binder and form a building block.

As shown in FIG. 1 to 6, the apparatus for manufacturing hybrid thermoplastic blocks includes a heating and charging station (1), a moulding station (2) and cooling station (3) which are generally indicated by the references (1), (2) and (3) respectively.

Figure 1:
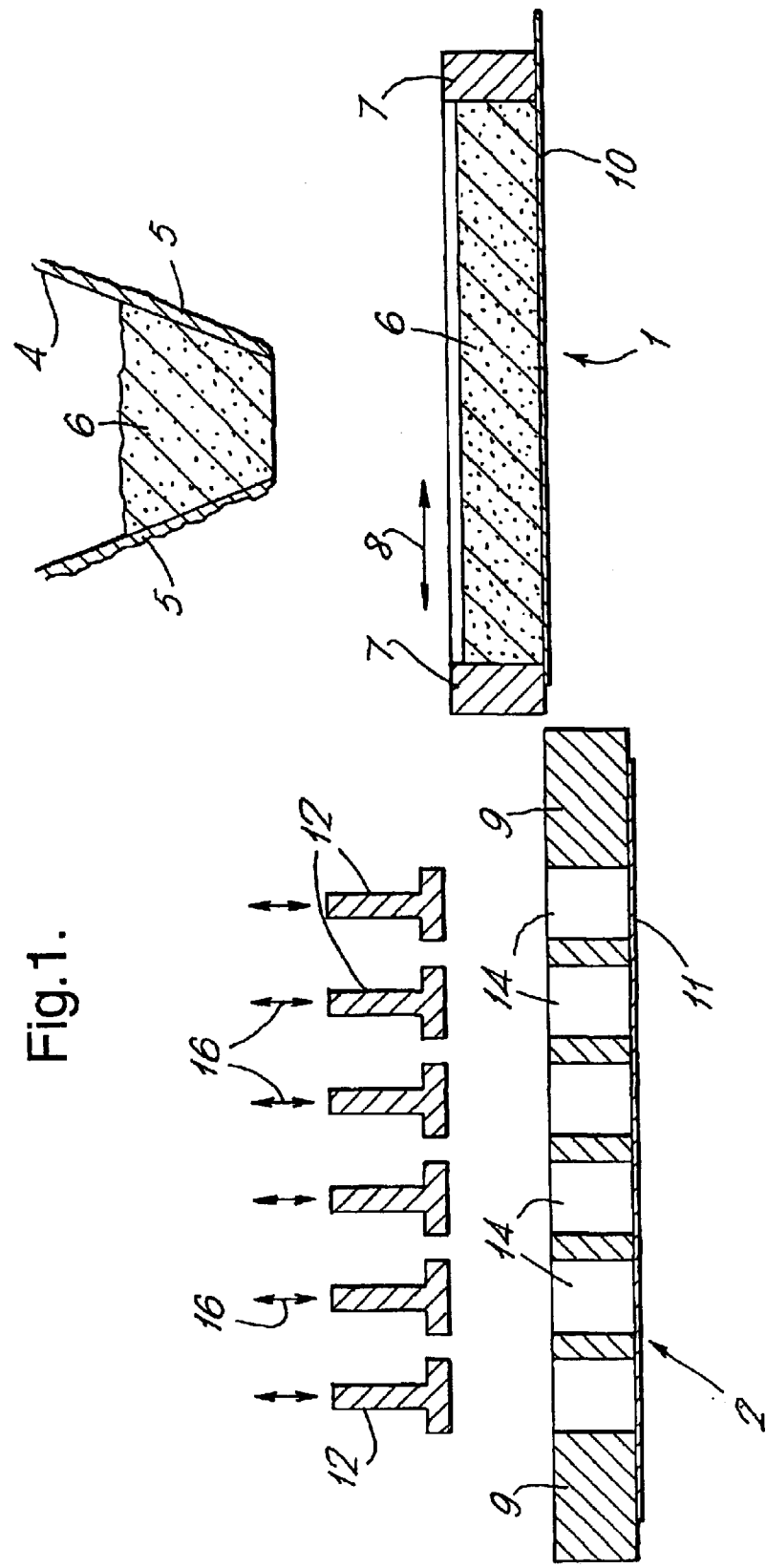

The heating and charging station (1) is shown in FIG. 1 and comprises a supply hopper (4) which is insulated against heat loss by lagging (5) and contains a hybrid thermoplastic mix (6) comprising sand and filler fine particles, aggregate coarse particles and a thermoplastic binder constituted by a thermoplastic material A thermoplastic binder that may conveniently be employed is a bituminous-based binder, more conveniently an asphaltenes-containing binder having a penetration of less than 15 dmm. The filler can be any one or combination of ground minerals such as limestone, flyash, furnace slag, furnace waste and slate. A slide drawer (7) is moveable in the directions indicated by the illustrated arrows (8) between upstream and downstream positions in which it is located beneath the hopper (4) and above a mould frame (9) respectively. In the upstream position, the slide drawer (7) is charged with a predetermined amount of hybrid thermoplastic mix (6) dispensed from the hopper (4). A stationary bottom member (10) is engaged by the slide drawer (7) in its upstream position to retain the hybrid thermoplastic mix (6) in the slide drawer (7).

Figure 2:
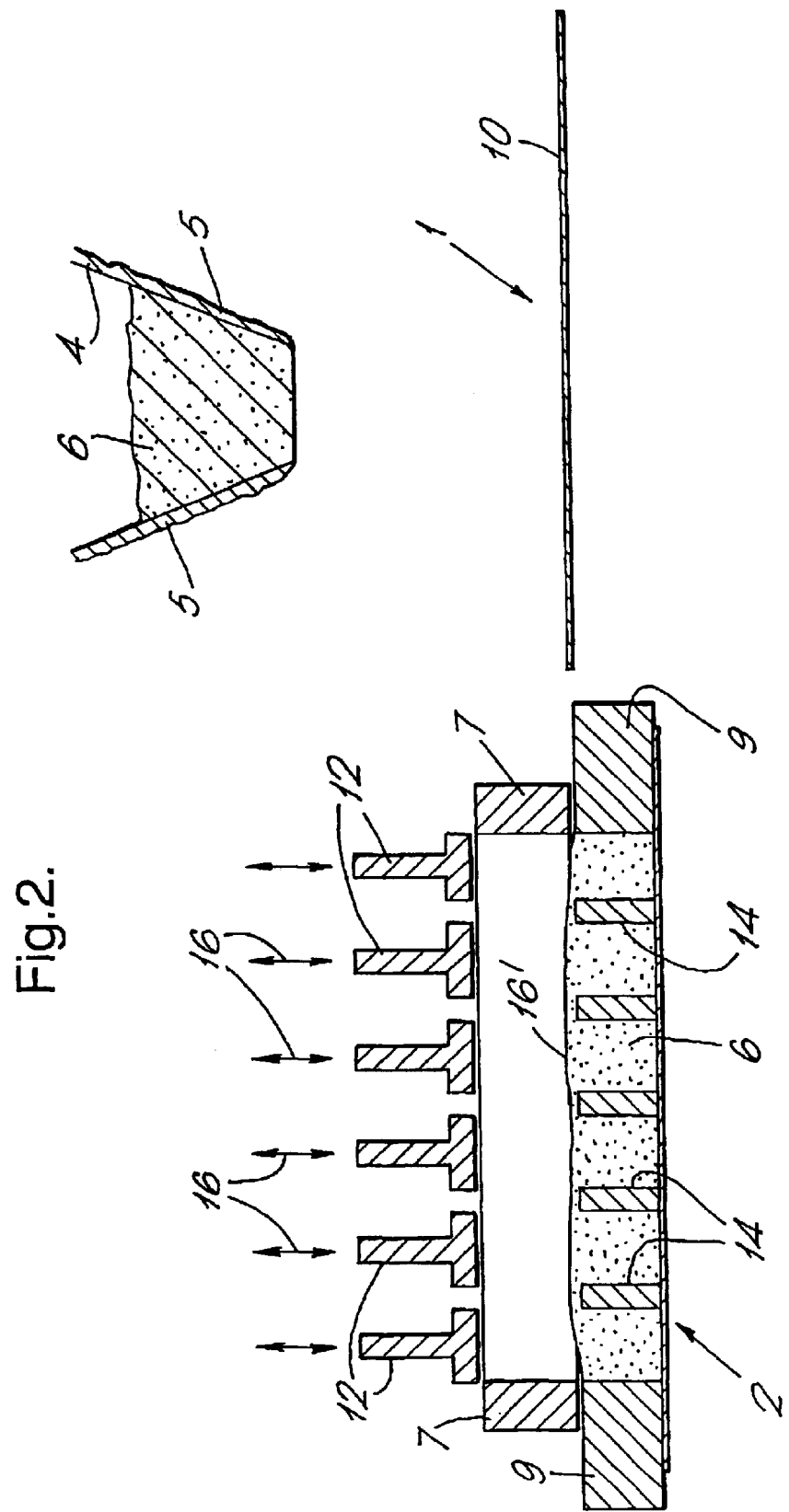
Figure 6:
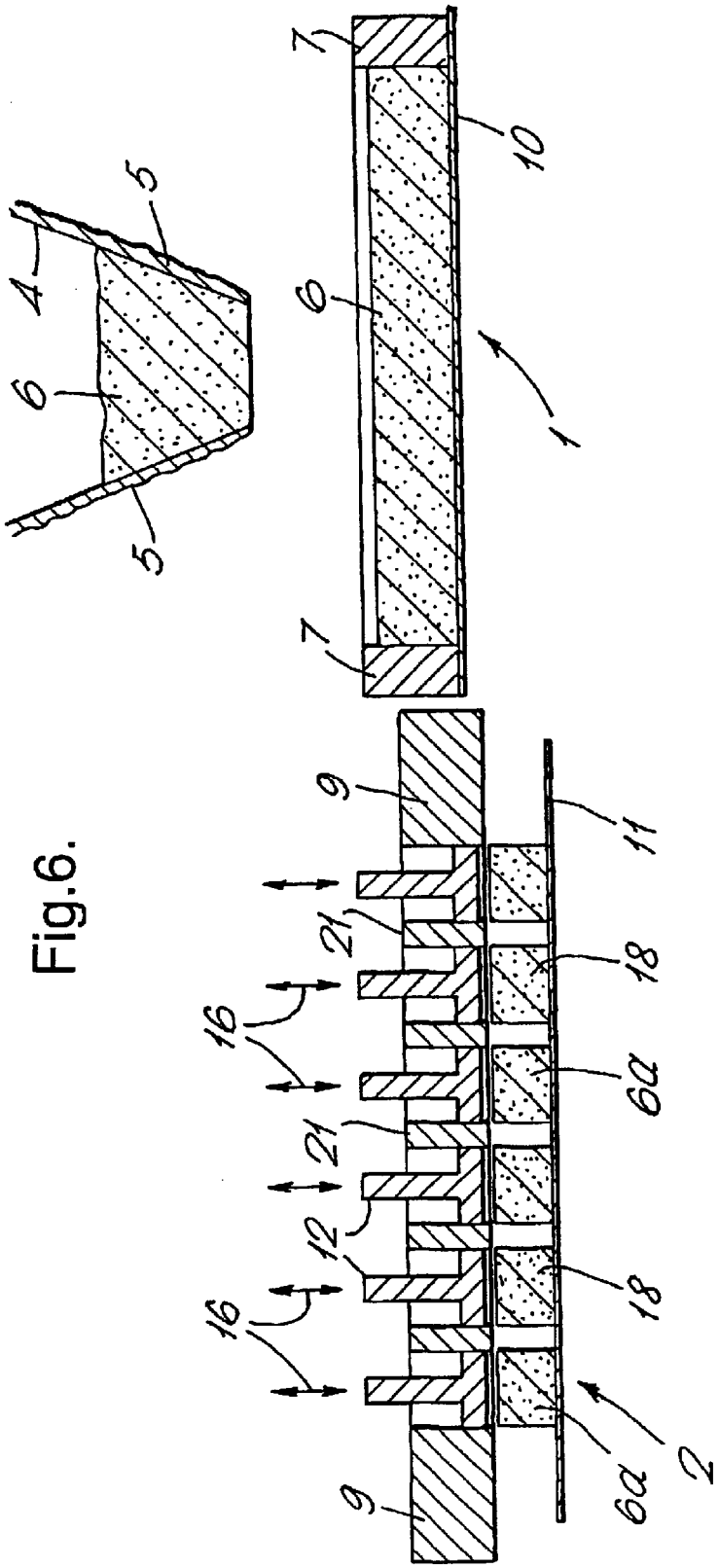

Downstream from the slide drawer (7) in the moulding station (2), the mould frame (9) is positioned on a pallet (11) in the form of a board disposed immediately beneath pressing means constituted by an array of compacting and stripping heads in the form of shoes (12) which are aligned with complementary mould cavities (14) in the mould frame (8) as shown in FIG. 2. The shoes (12) are moveable between the positions illustrated by the arrows (16) in which they are disposed above the mould cavities (14) and in alignment therewith and positions in which they engage in the mould cavities (14).

The slide drawer (7) in FIG. 2 has moved into its downstream position above the mould frame (9) into which the charge of hybrid thermoplastic mix (6) has been dispensed. The thermoplastic mix (6) fills and somewhat overflows the mould cavities (14) of the frame (9) and presents a surface (16') to the shoes (12). The hybrid thermoplastic mix (6) assumes the shape of the mould cavities (14) but at this moment in time is in an uncompacted state illustrated in FIG. 9 which will be referred to in more detail later.

The slide drawer is then moved back to its upstream position in the heating and charging station (1) where is it disposed beneath the hopper (4) to receive another charge of heated thermoplastic mix (6), as will be apparent from FIG. 4.

FIG. 3 shows the construction of a typical mould frame (9) comprising an outer frame portion (20) and divider plates (21) that form the side walls of individual mould cavities (14). Within the overall mould frame (9) resides cavities (14*a*), (14*b*), and (14*c*) differentiated in that cavities (14*a*) are formed with all four walls constructed from divider plates (21), cavities (14*b*) have three side walls constructed from divider plates (21) and one side wall constructed from the outer frame (20), and cavities (14*c*) have two side walls constructed from divider plates (21) and two side walls constructed from the outer frame (20).

The outer frame (20) is warmed by a flow of heated fluid in the form of water, oil or other liquid or gas supplied through a supply conduit (23) which is circulated around the outer frame (20) and out through the exit conduit (23*a*). The flow of heated fluid through the outer frame (20) prevents intimate contact with what would otherwise be a cold surface by ensuring that the surface of hybrid thermoplastic mix (6) is not cooled such as to cause localised re-solidification of the thermoplastic binder adjacent to wall areas (24).

Additionally, when the process has been in operation for some length of time, the wall surfaces (25) are sufficiently cooled by causing a cooling fluid to flow through dividers in the form of division plates (21) so that the surface of the hybrid thermoplastic mix (6) in contact with the plates (21) does not stick to the plates (21). In the event that large format products are being made the number of division plates required will be low and could be omitted.

In FIG. 4, the shoes (12) are shown in their positions in which they have been lowered on to the hybrid thermoplastic mix (6) and into the mould cavities (14). By applying pressure and/or vibration to the shoes (12), and optionally vibration to the underside of the pallet board (11), the hybrid thermoplastic mix (6) is compacted into the compacted state and is now designated the reference (6*a*) in FIG. 10, which will be referred to in more detail later to form building blocks which are indicated by the reference (18) in FIG. 6.

The lower surface (28) of each shoe (12) (see FIG. 5) that comes into close contact with the heated hybrid thermoplastic mix (6) is maintained at a temperature which is higher than ambient temperature but lower than the temperature of hybrid thermoplastic mix (6). This is achieved by causing a flow of fluid such as water, oil or other liquid or gas at a controlled temperature to pass through a flow passage (30) connected to inlet and outlet conduits (31) and (32) of the shoe (12). This ensures that when the shoes contact the thermoplastic mix (6) at the beginning of the pressing process and the first charge of hybrid thermoplastic mix (6) is pressed into the mould cavities (14), the lower surface (28) of the shoe (12) is sufficiently warmed by the flow of fluid. In this way, the upper surface of hybrid thermoplastic mix (6) is not cooled and localised solidification of the thermoplstic binder in the mix (6). which would have otherwise occurred due to contact with a cold surface is avoided. Moreover, when the process has been in operation for some length of time, the temperature of the fluid flowing through the shoe (12) is sufficient to cool the upper surface of hybrid thermoplastic mix (6) that it does not stick to the surface (28) of the shoe (12).

Referring now to FIG. (6), with the shoes (12) held in stationary alignment in the mould cavities (14) the mould frame (9) is raised to a position in which it clears the tops of the blocks (18) thereby in the process ejecting (stripping) the blocks (18) from the mould cavities (14). The array of shoes (12) is then also raised in the direction of the upper head of the arrows 16 and away from the tops of the blocks (18). This enables the entire array of blocks (18) on the pallet board (11) to be conveyed downstream of the mould frame (9) for further processing and the mould frame (9) to be lowered back on to the pallet board (11), as shown in FIGS. 1, 2 and 4, to allow the cycle which has just been described to be repeated.

Figure 7:
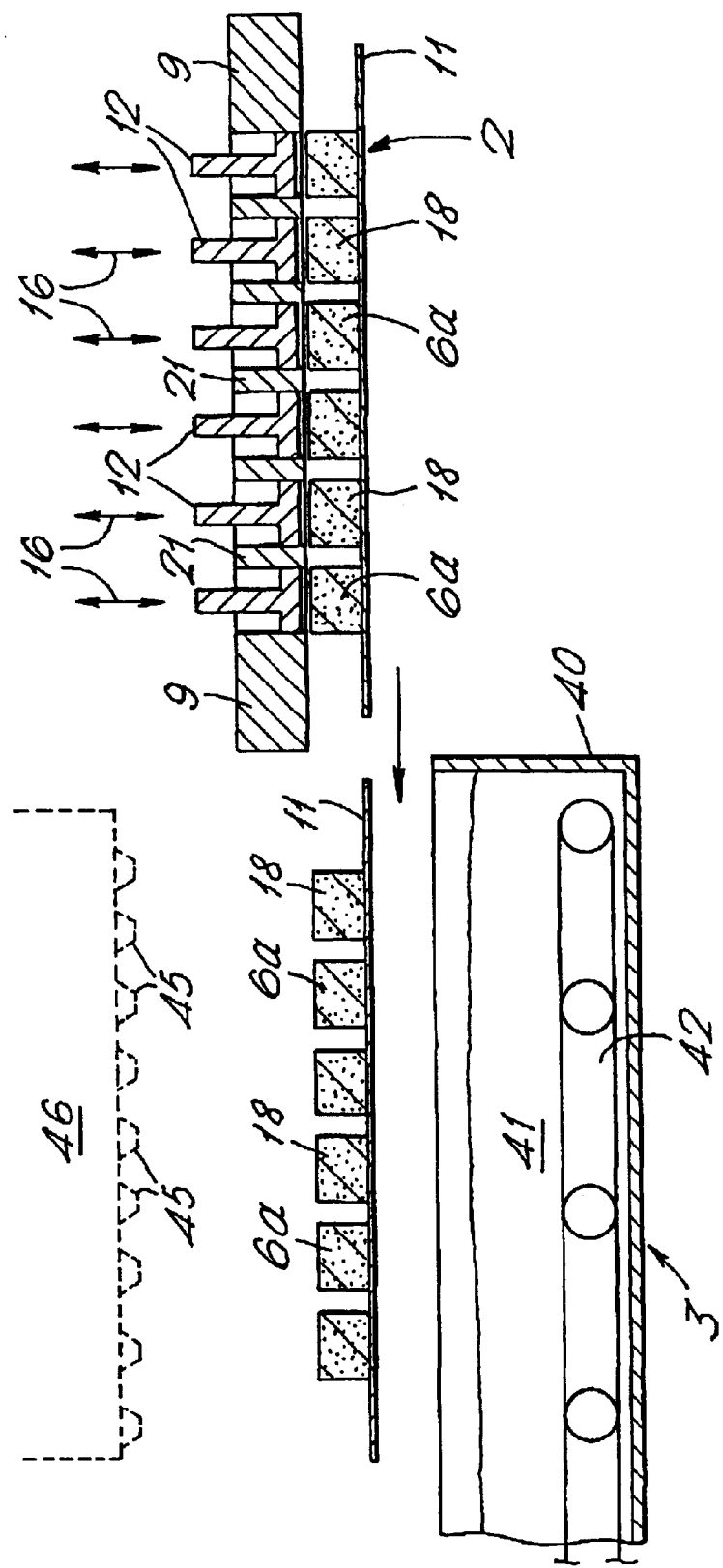
Figure 8:
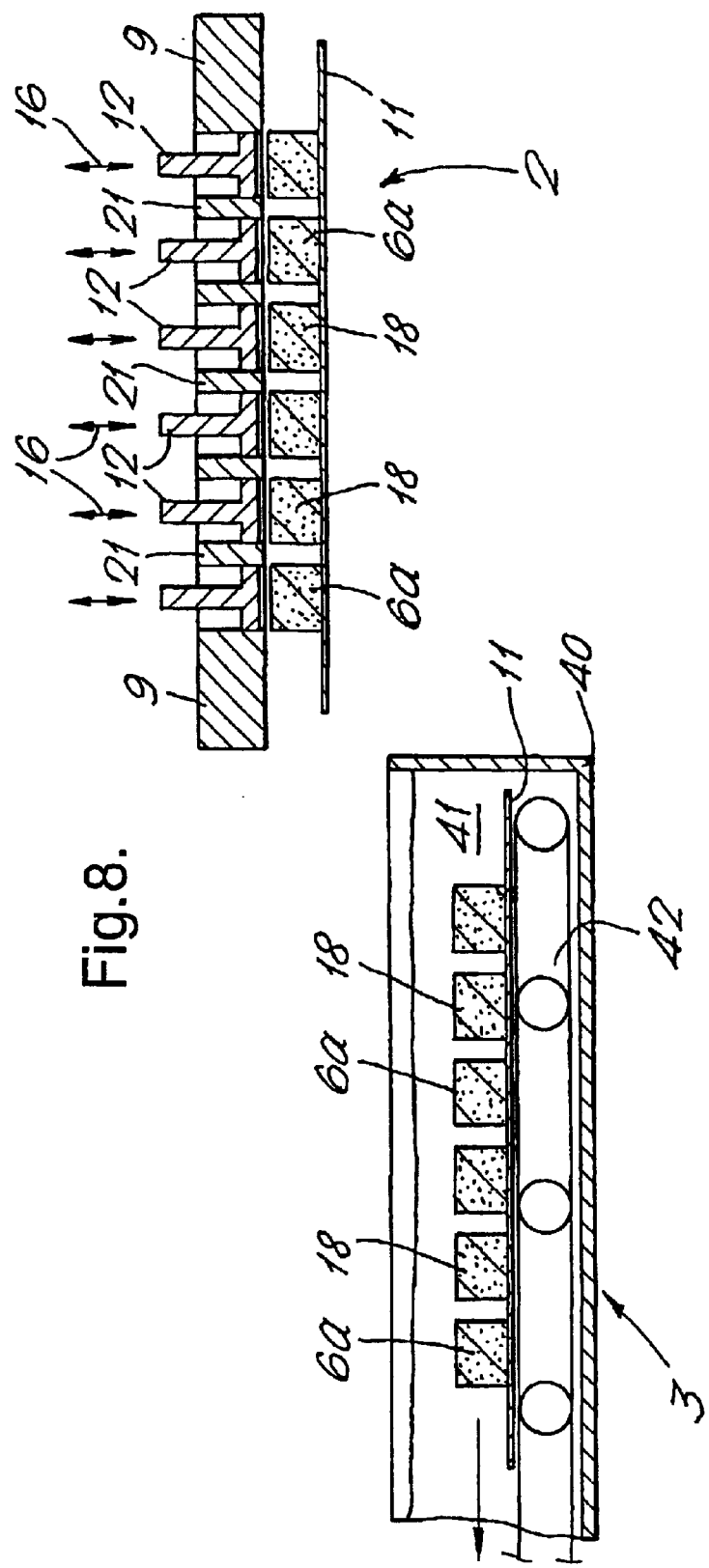

The blocks (18) on the pallet board (11) are then conveyed horizontally upstream from the moulding station (2) to a cooling station (3) as shown in FIG. 7. In the cooling station (3), the blocks (18) on the pallet board (11) are located in a position above a tank (40) that is partially filled with cold water (41). The pallet board (11) carrying the blocks (18) is then lowered into the tank (40) and on to a conveying means (42) such that the blocks (18) are completely immersed in the cold water (41) as shown in FIG. 8. The pallet board 11 carrying the blocks (18) is then moved by the conveying means (42) along the entire length of the tank (40). During immersion of the blocks (18) in the cold water (41), the thermoplastic binder in the blocks (18) is solidified at least in the area adjacent to the side walls of the blocks (18) which stabilises the shape of the blocks (18) throughout any further movement of the pallet board (11). Then the pallet board (11) carrying the blocks (18) is raised from the tank (40) and conveyed away to an optional racking station (not shown) where the blocks (18) are allowed to cool and the thermoplastic binder therein allowed completely to solidify.

Alternatively and as shown by dashed lines in FIG. 7, the blocks (18) on the pallet board (11) are cooled by drenching with water sprayed from above through spraying jets (45) of a spraying apparatus (46). When cooling of the blocks (18) is sufficient, the blocks (18) on the pellet board (11) are conveyed from the cooling station (3) and treated as described in the previous paragraph.

Figure 10:
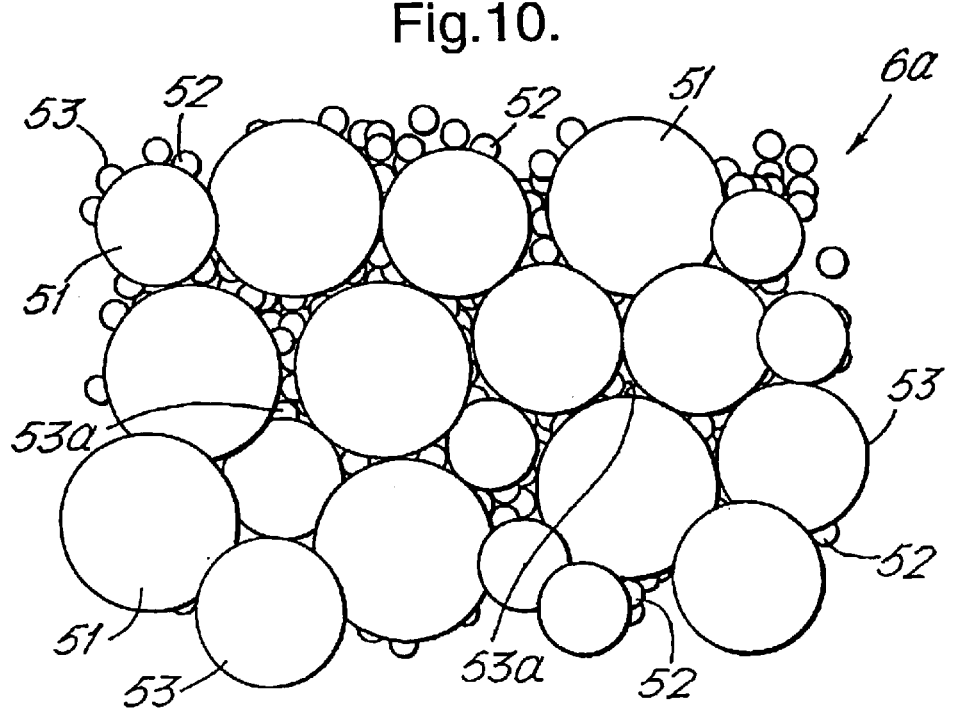
FIG. 10 is a similar view to that of FIG. 9 showing the state of the hybrid thermoplastic mix in a building product which has been formed and shaped by pressing and compacting in the apparatus of FIGS. 1 to 8.

When complete solidification of the thermoplastic binder in the blocks (18) has occurred, the constituents of the thermoplastic mix (6a) occupy the state which is shown in FIG. 10. Then the blocks (18) are fit to be subjected to secondary processing such as shotblasting, bush hammering etc. as hereinbefore referred to, before being packaged and shaped as required.

Figure 9:
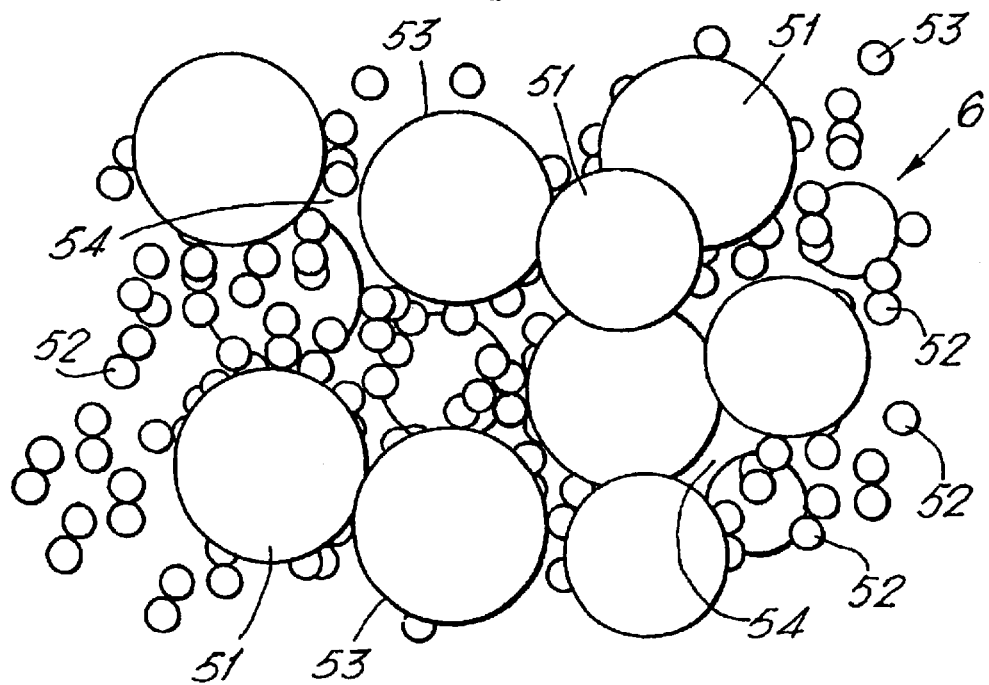
FIG. 9 is a diagrammatic view of the state of a hybrid thermoplastic mix prior to be pressed and compacted by the pressing apparatus of FIGS. 1 to 8.

Referring to FIG. 9, it will be seen that the uncompacted hybrid thermoplastic mix (6) comprises aggregate the particles (51), sand particles (52), and a mixture of fine filler and thermoplastic binder (53) in a loosely packed arrangement. The proportion of thermoplastic binder/fine filler (53) is in excess of that required to provide a single molecular layer to the total surface area of aggregate (51), sand (52), and forms a relatively thick layer (53) of thermoplastic binder/fine filler mixture around the aggregate particle (51) and sand particles (52), including voids (54).

In FIG. 10 the voids (54) between the particles (51), (52) of the loosely packed, uncompacted thermoplastic mix (6) shown in FIG. 9 have been eliminated. Instead, the particles (51), (52) are disposed in a closely packed arrangement produced by the compacting action of pressure and/or vibration. In this closely packed arrangement, the layer (53) of thermoplastic binder/fine filler mixture surrounding each particle is reduced in thickness due to migration of some of the thermoplastic binder/fine filler mixture (53) from around the particles (51), (52) to fill the voids (54) as indicated by the reference (53a).

Although the invention has been particularly described it will be appreciated that various modifications may be made without departing from the scope of the invention as define in the appended claims. For example, the pressing apparatus may be of any other suitable kind consistent with providing the required finished product. Moreover, air, applied by means of an air knife for example, may be used, instead of water, to cool the blocks (18) in the pallet board (11).

What is claimed is:

1. A method of manufacturing a building product from a mix including particulate material and a binder, characterized by the binder being a thermoplastic binder which binder is an asphaltenes-containing binder having a penetration of less than about 15 dmm, comprising:

heating the mix including the thermoplastic binder at least to a temperature at which the thermoplastic binder in the mix liquefies;

subjecting the heated thermoplastic mix to a pressing action that shapes the heated mix; and cooling the shaped heated thermoplastic mix to solidify the thermoplastic binder and form the building product;

wherein the heated thermoplastic mix flows into at least one mould cavity defined by an outer mould frame and in that the outer frame is warmed to prevent solidification of thermoplastic mix adjacent to the outer mould frame;

and further wherein the outer mould frame defines together with dividers an array of mould cavities and in that the dividers are cooled to prevent sticking of thermoplastic mix adjacent to the dividers.

2. The method according to claim 1, wherein the pressing action is carried out by at least one compacting head and in that the compacting head is subjected to the action of a fluid which prevents sticking of the head to the thermoplastic mix during the pressing action.

3. The method according to claim 1, wherein the proportion of thermoplastic binder is less than about 30% by weight of the thermoplastic mix.

4. The method according to claim 3, wherein the proportion of thermoplastic binder is less than about 10% by weight of the thermoplastic mix.

5. The method according to claim 1, wherein following the pressing action the shaped heated thermoplastic mix is cooled by the action of water.

6. The method according to claim 5, wherein the heated shaped thermoplastic mix is cooled by immersion in water.

7. The method according to claim 5, wherein the heated shaped thermoplastic mix is cooled by water sprays.

* * * * *